(12) United States Patent
Nakao et al.

(10) Patent No.: US 9,044,903 B2
(45) Date of Patent: Jun. 2, 2015

(54) PUNCTURE REPAIR KIT

(75) Inventors: Yukio Nakao, Kobeshi (JP); Tsutomu Kono, Kobeshi (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 267 days.

(21) Appl. No.: 13/879,868

(22) PCT Filed: Oct. 28, 2011

(86) PCT No.: PCT/JP2011/074957
§ 371 (c)(1),
(2), (4) Date: Apr. 17, 2013

(87) PCT Pub. No.: WO2012/060296
PCT Pub. Date: May 10, 2012

(65) Prior Publication Data
US 2013/0199666 A1    Aug. 8, 2013

(30) Foreign Application Priority Data

Nov. 5, 2010  (JP) ................................. 2010-249010
Nov. 19, 2010 (JP) ................................. 2010-259302

(51) Int. Cl.
*B29C 73/16*   (2006.01)
*B29L 30/00*   (2006.01)

(52) U.S. Cl.
CPC ........... *B29C 73/166* (2013.01); *B29L 2030/00* (2013.01)

(58) Field of Classification Search
CPC ..................................................... B29C 73/166
USPC ................................................... 141/38, 105
See application file for complete search history.

(56) References Cited

U.S. PATENT DOCUMENTS

| 6,766,834 B1 * | 7/2004 | Eckhardt | 141/38 |
| 6,789,581 B2 * | 9/2004 | Cowan et al. | 141/38 |
| 7,694,698 B2 * | 4/2010 | Marini | 141/38 |
| 7,798,183 B2 * | 9/2010 | Cegelski et al. | 141/38 |
| 8,459,150 B2 * | 6/2013 | Yoshida et al. | 81/15.6 |

(Continued)

FOREIGN PATENT DOCUMENTS

| JP | 2000-108215 A | 4/2000 |
| JP | 2008-932 A | 1/2008 |

(Continued)

OTHER PUBLICATIONS

PCT/ISA/210—International Search Report mailed on Nov. 22, 2011, issued in PCT/JP2011/074957.

*Primary Examiner* — Timothy L Maust
(74) *Attorney, Agent, or Firm* — Birch, Stewart, Kolasch & Birch, LLP

(57) ABSTRACT

A puncture repair kit that reduces the difference between a pressure displayed on a manometer of a compressor device and an actual tire internal pressure. The compressor device (2) is connected with a bottle unit (3) directly. A cap 6 comprises a one-way valve (14) to prevent puncture-sealing agent from flowing back toward the compressor device. A cylinder (12) of the compressor device (2) comprises a branch chamber (21) receiving compressed air from a pump chamber (11). The branch chamber (21) is connected with an air feeding passage (39) extending toward a bottle unit (3), a manometer (22), a relief valve (23), and a surge chamber (70) to store the compressed air from the pump chamber (11) and to reduce the pressure fluctuation of the compressed air.

18 Claims, 16 Drawing Sheets

(56) References Cited

U.S. PATENT DOCUMENTS 8,522,833 B2 * 9/2013 Chou .............................. 141/38
8,684,046 B2 * 4/2014 Kojima et al. .................. 141/38
8,733,407 B2 * 5/2014 Eckhardt ........................ 141/38

FOREIGN PATENT DOCUMENTS

| JP | 2010-18005 A | 1/2010 |
|----|--------------|--------|
| JP | 2010-36509 A | 2/2010 |

* cited by examiner

FIG.4
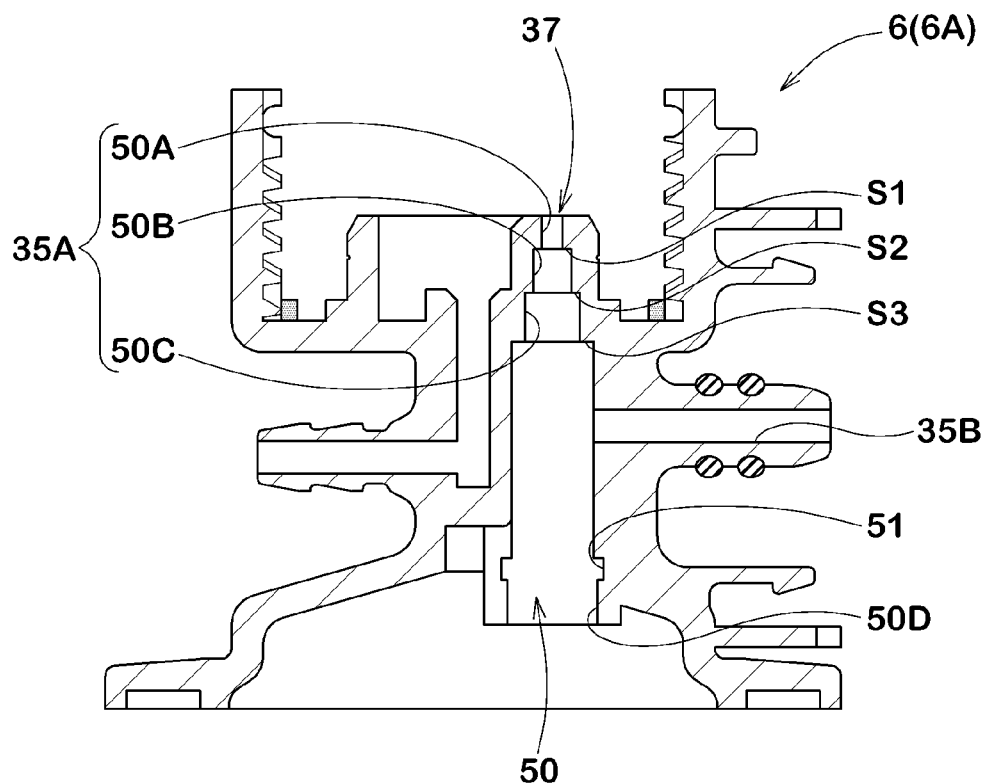
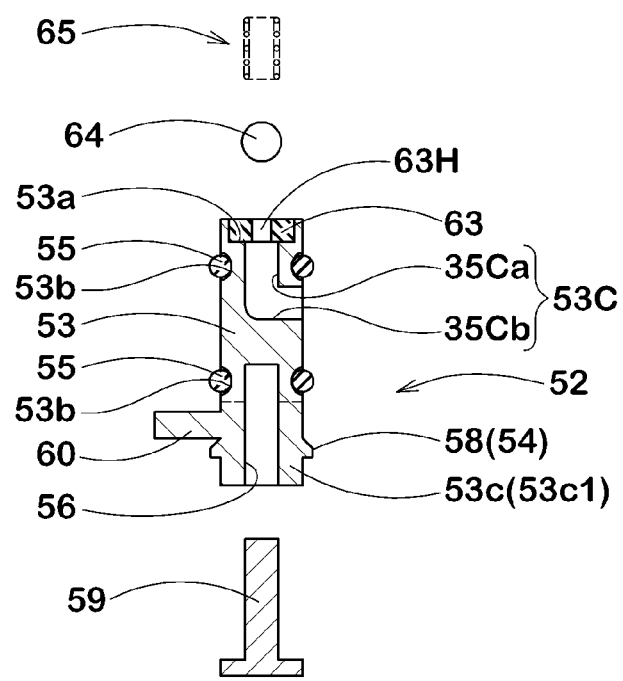

PUNCTURE REPAIR KIT

TECHNICAL FIELD

The present invention relates to a puncture repair kit for tire to inject puncture-sealing agent and compressed air in succession into a punctured tire and to repair the puncture as an emergency procedure.

BACKGROUND OF THE INVENTION

An example of a puncture repair kit for repairing a puncture as an emergency procedure is the following Patent Document 1. Into a puncture tire, puncture-sealing agent and compressed air are injected in succession, and the punctured tire is pumped up; and in this state, owing to roll the tire, the puncture-sealing agent covers a whole circumference of a cavity surface of the tire so as to seal the puncture hole as the emergency procedure.

As shown in FIG. 16, such a repairing kit comprises a compressor device (a) and a bottle unit (d). The bottle unit (d) comprises a bottle container (b) enclosing puncture-sealing agent and a cap (c) attached to an opening of this bottle container (b). The cap (c) comprises an air intake port c1 to intake the compressed air from the compressed air discharge port into the bottle container (b), and a sealing agent/compressed air removal port c2 to remove in succession the puncture-sealing agent and the compressed air from the bottle container (b) by sending this compressed air. The air intake port c1 is connected with an air supply hose e1 from the compressor device (a). The sealing agent/compressed air removal port c2 is connected with a second end of a feeding hose e2 of which first end is connected with the air valve of the tire T.

This repair kit comprises two hoses e1, e2, so that the horses are apt to be piped in the wrong. Because of poor stability of a bottle unit (d), there is a problem that the bottle unit (d) falls down while at work, and necessary quantity of puncture-sealing agent cannot be injected in the punctured tire.

Upon this, the present inventor proposed a structure of the air intake port c1 of the bottle unit (d) to connect directly to the compressor device (a). Hence, the bottle unit (d) and the compressor device (a) are integrally formed, and its center of gravity is low so as to increase the stability and to prevent the falling of the bottle unit. Moreover, as the hose e1 for air intaking is not required, there is no possibility of wrong piping. FIG. 15 (A) is a conceptual diagram showing a part of an inside structure of this case. In FIG. 15 (A), a drawing symbol (f) is a pump chamber to generate compressed air; a drawing symbol (g) is its piston; a drawing symbol (h) is a relief valve; a drawing symbol (i) is a manometer; a drawing symbol (j) is a one-way valve to prevent the puncture-sealing agent from flowing back from the bottle container (b) toward the compressor device (a); and a drawing symbol (k) is a passage from the discharge port fl of the pump chamber (f) to the one-way valve (j).

However, when connecting the bottle unit (d) with the compressor device (a) directly, as shown in FIG. 15 (B) for example, the inventor found that there was a large variance D between a pressure Pi displayed on the manometer (i) of the compressor device (a) and an actual internal pressure Pt of the tire T filled up by this compressed air. So, there was a problem that the actual tire internal pressure Pt was higher than the pressure Pi displayed on the manometer (i) by about 90 kPa, for example, when leaving the compressor device (a) on and pumping up a puncture repaired tire up to a relief pressure of the relief valve (h). At this time, there was no safety hazard because the tire did not get any pressure beyond the ability of the compressor device (a), but it might give a user a sense of uncertainty and unease.

The inventor studied about the source of trouble of the variance D and found the following sources:

(a.) A pressure fluctuation of the compressed air caused by reciprocatory motion of the piston (g);

(b.) The one-way valve (j) to prevent the puncture-sealing agent from flowing back from the bottle container (b) toward the compressor device (a); and (c.) A decrease in volume of the passage (K) owing to the direct connection.

That is to say, the decrease in volume of the passage (K) caused a large pressure fluctuation of the compressed air in this passage (K). And, since the one-way valve (j) was provided, a higher compressed air pressure than the relief pressure of the large pressure fluctuation flew into the tire through the one-way valve (j). However, the manometer (i) displayed the lower compressed air pressure of in the large pressure fluctuation, so that it was thought that the variance D generated. Therefore, preventing a pressure fluctuation width of the compressed air in the passage (K) as small as possible was required for the reduction of the variance D. Incidentally, there was not such a variance D when forming no one-way valve (j); however, in the case of the direct connection, the puncture-sealing agent flows back from the bottle container (b) since the passage (K) was short, and the compressor device (a) might be possibly damaged.

Patent Document 1: Japanese unexamined Patent Application Publication No. 2000-108215.

DISCLOSURE OF THE INVENTION

Problems to be Solved by the Invention

Thereupon, it is an object of the present invention to provide a puncture repair kit to prevent the pressure fluctuation range of the compressed air in the passage and to reduce the difference between the pressure displayed on the manometer of the compressor device and the actual tire internal pressure.

Means for Solving the Problem

To solve the above-mentioned problems, the present application discloses in claim 1 a puncture repair kit comprising a compressor device comprising a compressed air discharge port to discharge compressed air, and a bottle unit comprising a bottle container containing a puncture-sealing agent and a cap provided on an opening of the bottle container. The cap comprises an air intake port capable of connecting directly to the compressed air discharge port and of sending the compressed air from the compressed air discharge port into the bottle container through a first flow channel, a sealing agent/compressed air outlet port to bring out in succession the puncture-sealing agent and the compressed air from the bottle container through the second flow channel by this sending of the compressed air, and the first flow channel provided with a one-way valve to prevent the puncture-sealing agent from flowing back toward the compressor device. The compressor device comprises a cylinder comprising a pump chamber to compress the air with a reciprocatory motion of a piston, and a branch chamber receiving the compressed air from the pump chamber. The branch chamber is connected to the air feeding passage sending the compressed air from the branch chamber to the compressed air discharge port, a manometer to measure a pressure of the compressed air, and a relief valve.

The branch chamber is connected to a surge chamber to reduce a pressure fluctuation of the compressed air sent by storing the compressed air from the pump chamber.

Effect of the Invention

As above stated, in the compressor device of the present invention, the branch chamber of a cylinder comprising the pump chamber and the branch chamber is connected with the surge chamber. The surge chamber increases the content of space between an outlet port of the pump chamber and the one-way valve. This can lower a pressure fluctuation width of the compressed air in the passage and can reduce the difference between the pressure displayed on the manometer of the compressor device and the actual tire internal pressure.

BRIEF EXPLANATION OF THE DRAWING

FIG. 4 is an exploded cross-sectional view of an inside structure of a cap.

FIG. 15 (B) is a graph of a pressure Pi displayed on a manometer and an actual tire internal pressure Pt showing a debatable point at the time.

EXPLANATION OF THE REFERENCE

Figure 1:
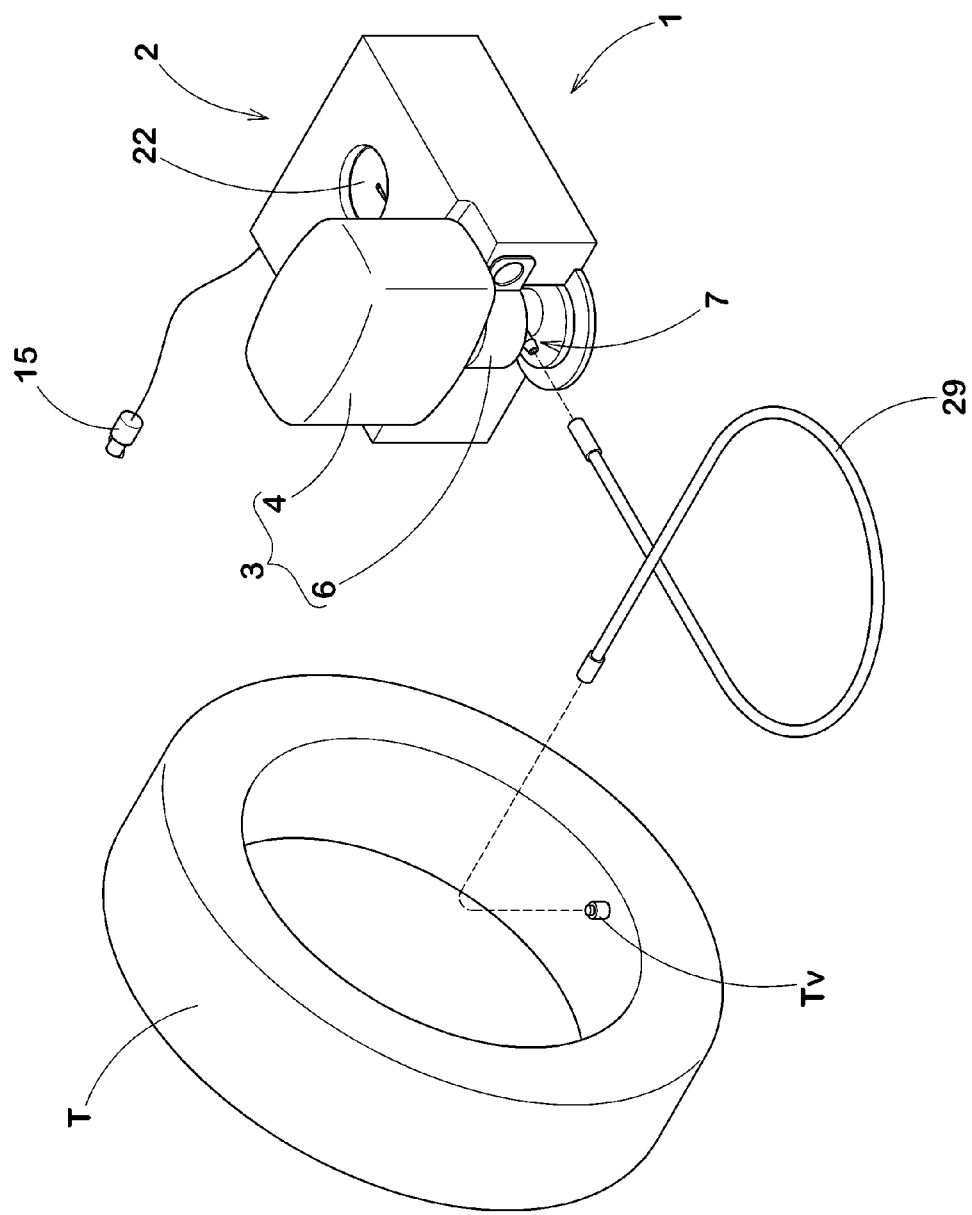
FIG. 1 is a perspective view showing a situation of puncture repairing by use of the puncture repair kit of the present invention.

1 Puncture repair kit
2 compressor device
3 Bottle unit
4 Bottle container
5 opening
6 Cap
7 sealing agent/compressed air outlet port
8 Compressed air discharge port
10 Piston
11 Pump chamber
12 Cylinder
14 One-way valve
21 Branch chamber
22 Manometer
23 Relief valve
25 Connecting cylindrical portion
27 Air intake port
35 First flow channel
36 second flow channel
39 Air feeding passage
41 connecting nozzle
70 Surge chamber
71 Hose
72 Buffer tank
73 Nipple fitting
75 Screw hole
76 Outside screw part
77 Hose joining section
78 Flange portion
79 Fitting main part
80 Rubber packing
81 circumferential groove
91 contact protective wall

BEST MODE FOR CARRYING OUT THE INVENTION

Hereinafter, preferred embodiments of the present invention will be concretely described.

As shown in FIG. 1, a puncture repair kit 1 of the first embodiment comprises a compressor device 2 and a bottle unit 3. The bottle unit 3 comprises a bottle container 4 containing puncture-sealing agent and a cap 6 attached to its opening 5 (shown in FIG. 3). The compressor device 2 and the bottle unit 3 are directly connected without hose and the like intervention at a repairing scene of tire puncture. One end of this feeding hose 29 of which the other end is connected to an air valve Tv of the tire T is previously connected to a sealing agent/compressed air removal port 7 disposed in the bottle unit 3. During storage, this feeding hose 29 is stored while keeping the connected state with the sealing agent/compressed air removal port 7, and the feeding hose is wrapped around the cap 6.

Figure 2:
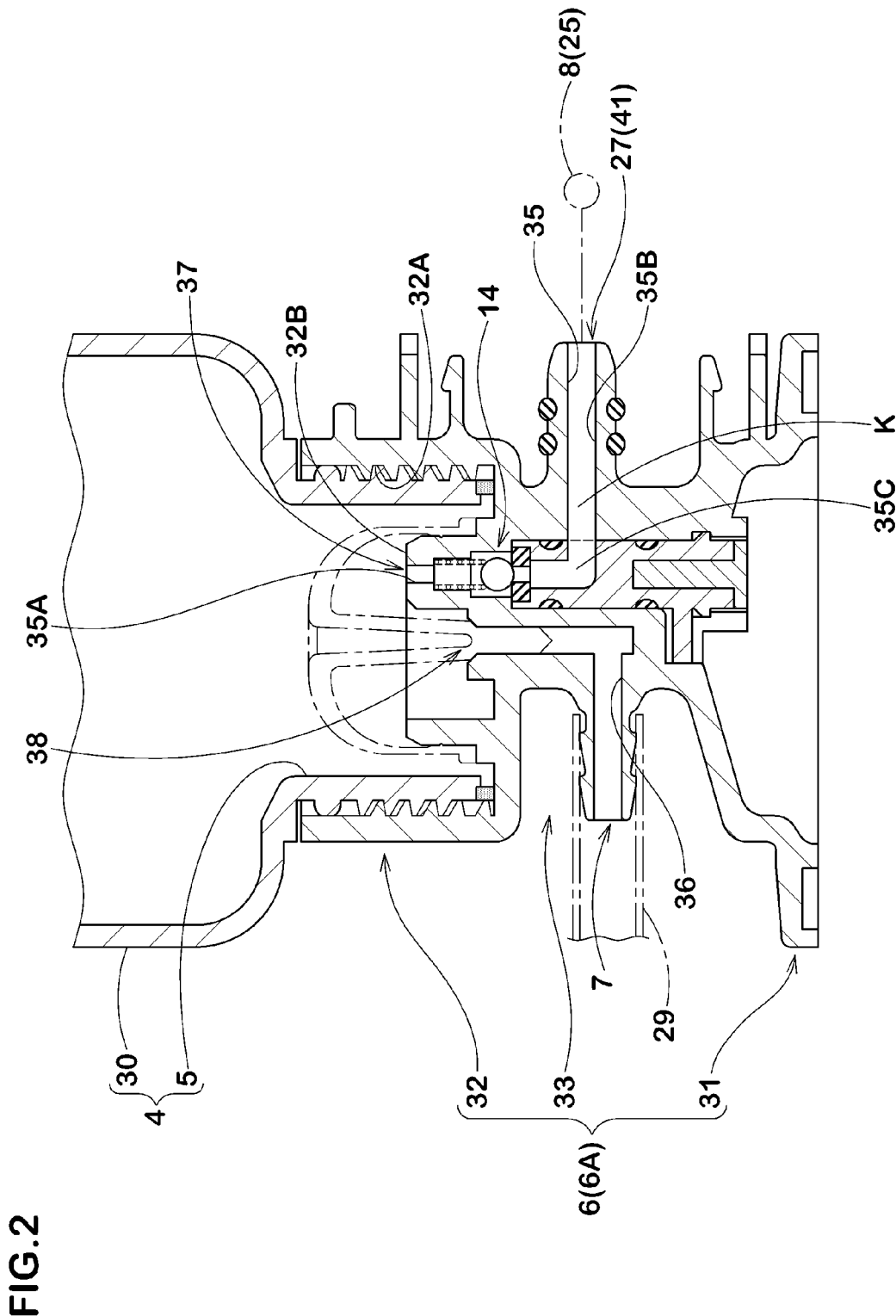
FIG. 2 is a cross-sectional view of a bottle unit.

As shown in FIG. 2, the bottle container 4 is provided in a lower end of a trunk portion 30 with a protruding small-diameter cylindrical opening 5 capable of taking the puncture-sealing agent in and out.

The cap 6 comprises the air intake port 27 being connectable directly with the compressed air discharge port 8 and sending the compressed air from the compressed air discharge port 8 into the bottle container 4, and the sealing agent/compressed air removal port 7 to bring out in succession the puncture-sealing agent and the compressed air from the bottle container 4 by sending this compressed air.

More particularly, the cap 6 comprises a cap main portion 6A comprising integrally a discoid basal plate 31 forming a basal plane, a bottle attaching part 32 to attach the opening 5 of the bottle container 4, and a waist part 33 disposed therebetween. And, in this cap main portion 6A, there are a first air flow passage 35 extending from the air intake port 27 into the opening 5 of the bottle container 4, and a second flow passage 36 extending from the sealing agent/compressed air removal port 7 into the opening 5 of the bottle container 4.

The bottle attaching part 32 comprises an attaching concave part 32A to fix the opening 5, and a boss portion 32B rising from a basal plane of this attaching concave part 32A. The attaching concave part 32A is capable of helically attaching the opening 5 provided in its sidewall face with an inside screw. And, the top surface of the boss portion 32B is provided with a first flow passage upper opening 37 where the top end of the first flow passage 35 opens, and with a second flow passage upper opening 38 where the top end of the second flow passage 36 opens.

The first flow channel 35 is provided with a one-way valve 14 to prevent the puncture-sealing agent from flowing back toward the compressor.

The first flow channel 35 comprises a vertical flow passage 35A extending inferiorly from an upper opening 37 of the first flow channel, a horizontal flow passage 35B extending laterally from the air intake port 27, and a L-shaped joint flow passage 35C connecting them. As shown in FIG. 4, the cap 6 comprises a vertical hole 50 extending inferiorly from the first flow channel upper opening 37, comprising steps of which inside diameters increases in stages. This vertical hole 50 comprises a first vertical hole 50A extending inferiorly from the first flow channel upper opening 37, a second vertical hole 50B connecting with this first vertical hole 50A via a first stepped face 51, a third vertical hole 50C connecting with this second vertical hole 50B via a second stepped face 52, and a fourth vertical hole 50D connecting with this third vertical hole 50C via a third stepped face S3.

The lower end of the fourth vertical hole 50D opens in a basal plane of the cap main part 6A and is provided on the lower end side with a locking groove 51 extending circumferentially.

The first to third vertical holes 50A to 50C form a vertical flow passage 35A. Inside the fourth vertical hole 50D, a valve seat case 52 is inserted from the lower end of the fourth vertical hole 50D.

The valve seat case 52 comprises a column-shaped basal portion S3 inserted in the fourth vertical hole 50D. The basal portion 53 is provided in the upper end with a valve seat attaching concave portion 53a for a valve seat 63. The basal portion 53 is provided in the lower end with a retaining device 54 to prevent falling out from the fourth vertical hole 50D by interlocking the locking groove 51. The valve seat 63 has a ring-like shape comprising a valve hole 63H. The valve seat 63 is made of a hard rubber elasticity in the present embodiment and is held between the third stepped face S3 and a basal plane of the valve seat attaching concave portion 53a.

The basal portion 53 comprises the joint flow passage 35C. This joint flow passage 35C comprises a vertical joint flow passage 35Ca which opens in the basal plane of the valve seat attaching concave portion 53a and is conducted with the vertical flow passage 35A via the valve hole 63H; and a horizontal joint flow passage 35Cb which is bent on its lower end, opens on an outer circumferential surface of the basal portion 53, and conducts with the horizontal flow passage 35B.

Around the basal portion 53, there are formed ring-attaching grooves 53b, 53b having a cross-section semicircle shape to attach an O-shaped ring 55 for sealing between the basal portion 53 and the fourth vertical hole 50D. The O-shaped rings 53b are disposed both high and lower positions than the opening of the horizontal joint flow passage 35Cb. Therefore, the horizontal flow passage 35B and the joint flow passage 35C are connected densely.

Figure 5A:
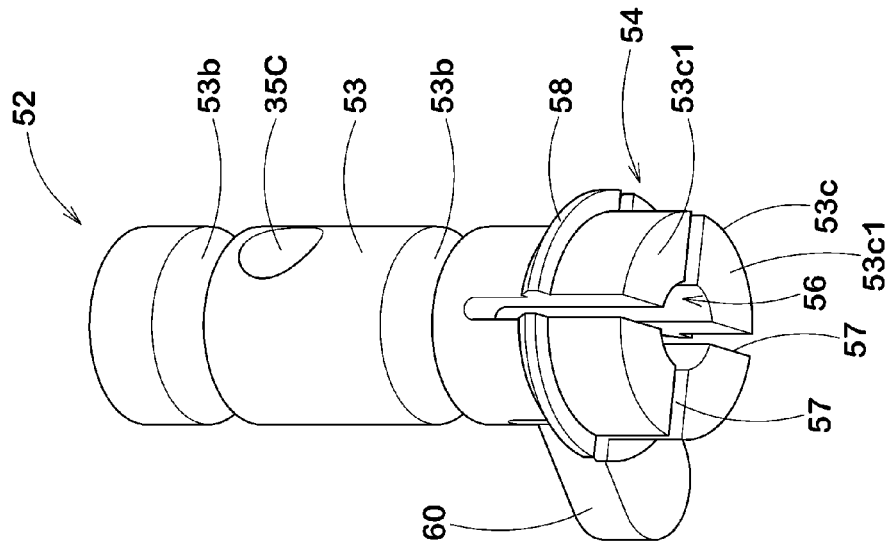
FIGS. 5 (A) and (B) are a side view and a perspective view of a valve seat case.
Figure 5B:
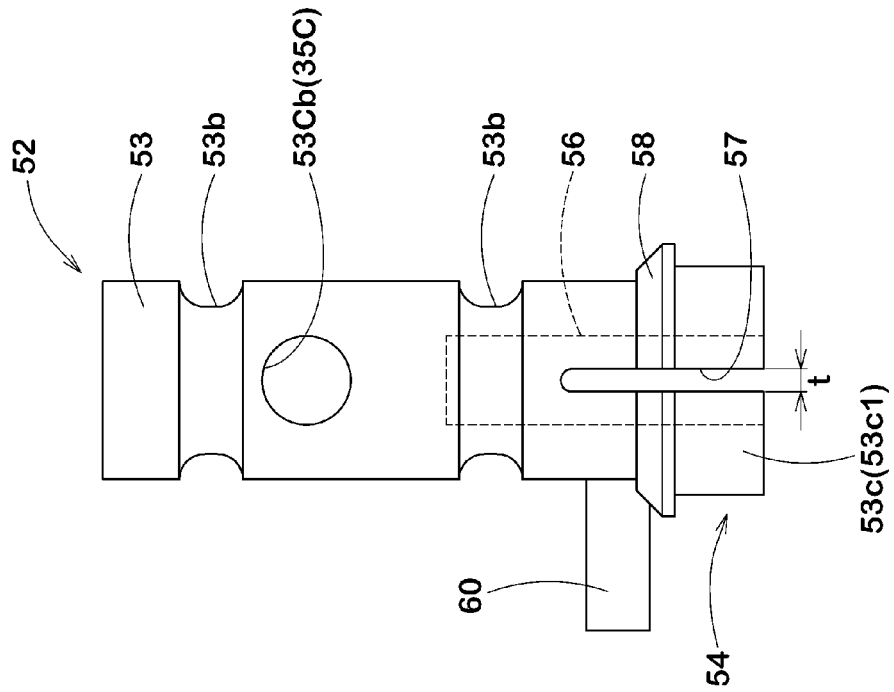

As shown in FIG. 5, the retaining device 54 comprises a central hole 56 extending superiorly along the shaft center from the lower end of the basal portion 53, plural of small-width slits 57 being capable of dividing an annular circumferential wall portion 53c disposed around this central hole 56 into plural circumferential fan-like pieces 53c1, a circumferential locking rib 58 protruding from an outer circumferential surface of each of the fan-like pieces 53c1 and being capable of interlocking with the locking groove 51.

The central hole 56 terminates lower than the joint flow passage 35C. The slit 57 extends superiorly from the lower end of the basal portion 53 in a radial fashion thereby dividing the circumferential wall portion 53c into plural of fan-like pieces 53c1, which are elastically deformable radially inside and outside. The retaining device 54 of the present embodiment comprises a connecting shaft 59 connecting with the central hole part 56. This connecting shaft 59 prevents a radially inward elastic deformation of the fan-like piece 53c1 and prevents the interlocking separation of the locking rib 58 from the locking groove 51. The valve seat case 52 comprises a lever-like protrusion 60 protruding from the outer circumferential surface of the basal portion 53, for example. This protrusion 60 prevents the valve seat case 52 from turning over, thereby preventing a position gap between an opening of a horizontal flow passage 35B and an opening of a horizontal joint flow passage 35cb.

As shown in FIG. 4, a one-way valve 14 comprises a valve seat 63, a ball-like spherical valve 64 which is movably inserted into the third vertical hole 50C and can open and close a valve hole 63H of the valve seat 63, and a bias power spring 65 disposed in a second vertical hole 50B and energizes the spherical valve 64 toward the valve seat 63.

One of the compressed air discharge port 8 and the air intake port 27 is formed as a connecting nozzle 41 protruding toward the other. The other is formed as a connecting cylindrical portion 25 protruding toward the one, having a central hole, and being capable of connecting directly by connecting with the connecting nozzle 41 into the central hole of the connecting cylindrical portion. In the present embodiment, the air intake port 27 is formed as the connecting nozzle 41.

Figure 3:
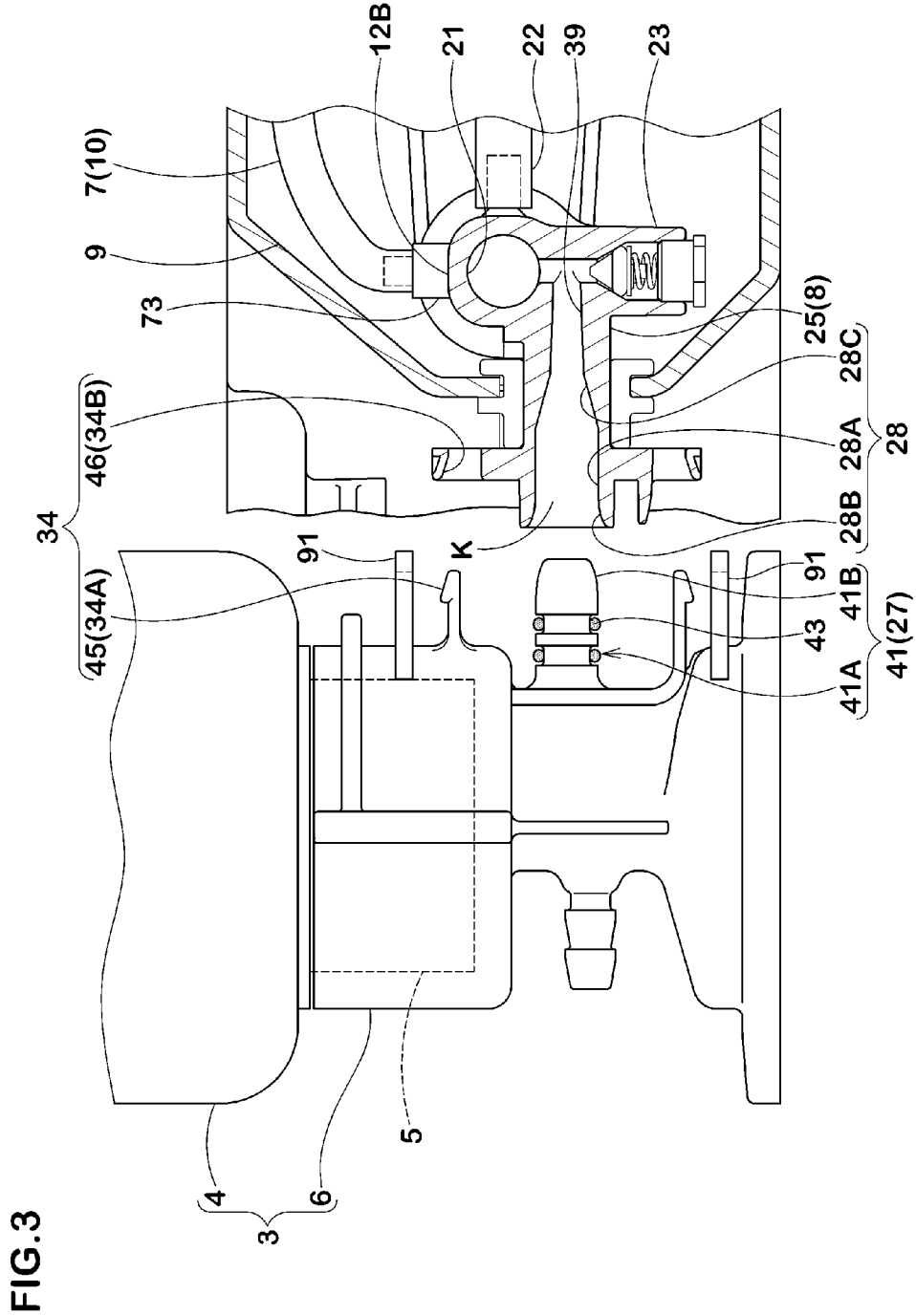
FIG. 3 is a partial cross sectional view of a situation before connecting the bottle unit with a compressor device.

As shown in FIG. 3, the connecting nozzle 41 is provided with a tapered surface 41B having a tapered cone-shape on a tip end of the nozzle main body 41A having a constant outer diameter. The connecting nozzle 41 is provided around the nozzle main body 41A with an O-shaped ring 43 sealing between the connecting nozzle and an inner surface of the joint concave portion 28. The O-shaped ring 43, consumable supply, is arranged on the bottle unit 3; this helps to use the compressor device 2 repeatedly without maintenance.

The puncture repair kit 1 of the present embodiment is provided with a securing device 34 to prevent getting its environment dirty with the puncture-sealing agent because of disconnection between the compressed air discharge port 8 and the air intake port 27 under repairing of the punctured tire.

This securing device 34 comprises a locking device 34A disposed in the cap 6, and a retaining device 34B formed in the compressor device 2. In the present embodiment, the locking device 34A is provided at its tip with a pair of locking clicks 45 protruding on the both sides (in the present embodiment, upper and lower) of the connecting nozzle 41 of the air intake port 27 toward the compressor device 2 and having a right-triangle-shaped. In the present embodiment, the retaining device 34B is made of a click interlocking hole 46 disposed at a position facing to the locking click 45 and being capable of preventing from falling-off by interlocking with the locking click 45.

Meanwhile, the locking device 34A (locking click 45) and a cap main part 6A are formed as an integrally formed body made of plastic such as nylon, polypropylene, polyethylene, or reinforced plastic containing together the above-mentioned plastics and the plastic containing short fiber such as fiberglass, for example. The retaining device 34B (click interlocking hole 46) in the present embodiment is formed by use of a frame 47 (shown in FIG. 6) supported by the connecting cylindrical portion 25. This frame 47, the connecting cylindrical portion 25, and the cylinder 12 are formed as an integrally formed body made of lightweight alloy such as zinc alloy, aluminum alloy and the like.

Figure 7:
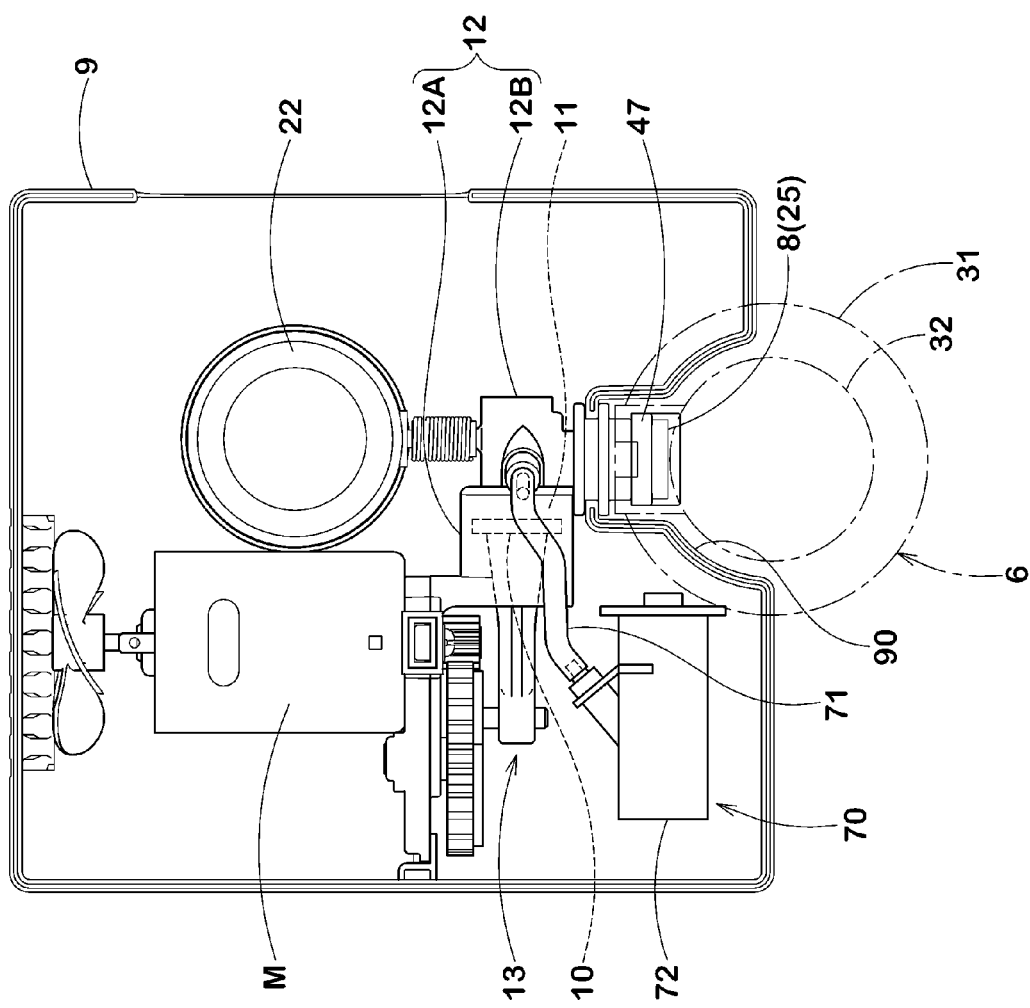
FIG. 7 is a plan view of an inside structure of the compressor device.

As shown in FIG. 7, the compressor device 2 comprises at least a motor M housed within the housing 9 and a compressor body 13. The compressor body 13 comprises a cylinder 12 that forms a pump chamber 11 with the piston 10 connected to the motor M.

Figure 6:
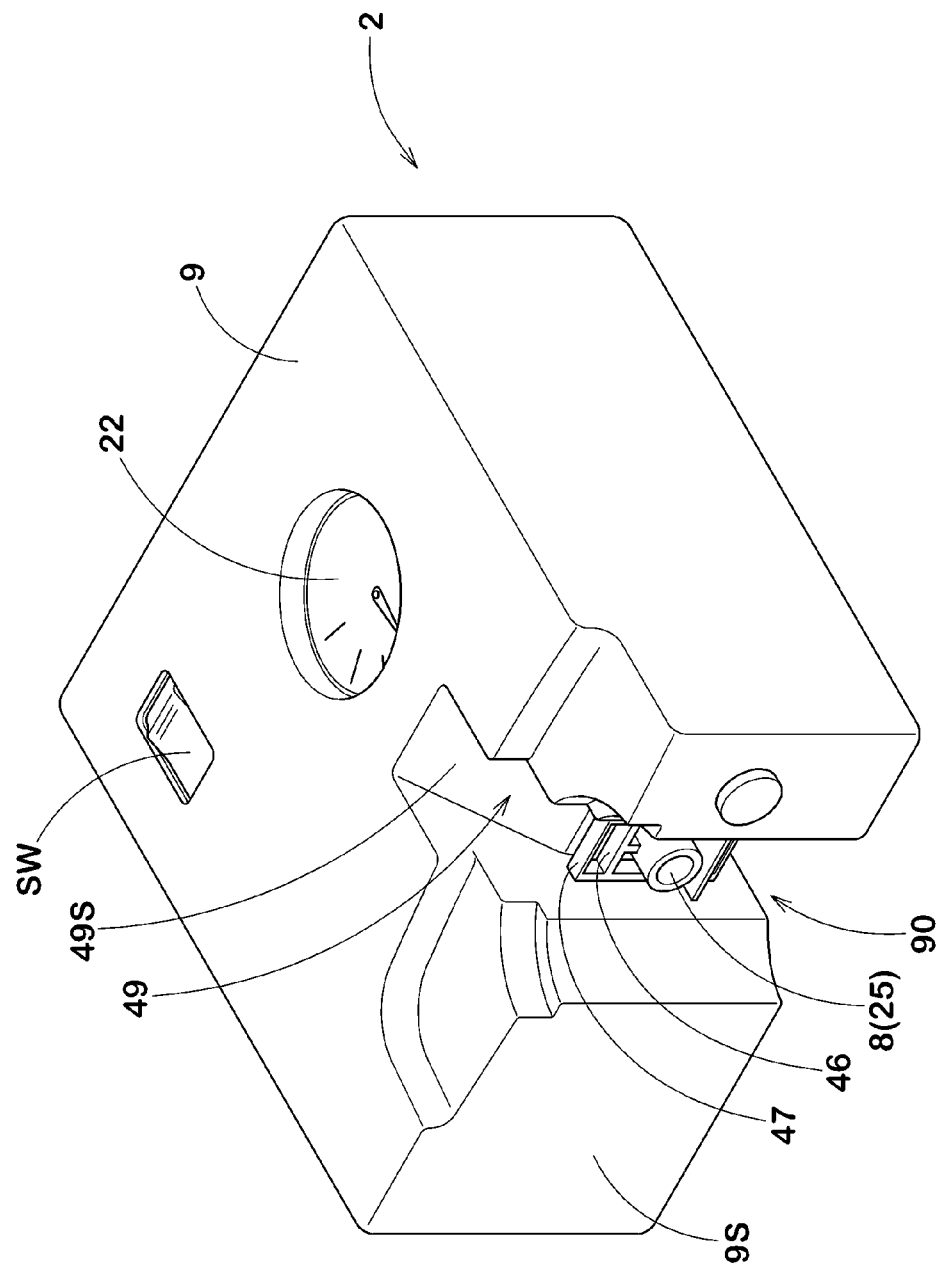
FIG. 6 is a perspective view of a compressor device.

As shown in FIGS. 1 and 6, the housing 9 is formed as a shape of a flat rectangular box with a low height and formed decomposable in upper and lower case parts. For the motor M, a commercial-release various DC motor powered direct current power supply of 12 V of an automobile can be employed. To this motor M, a power-supply cord provided at its tip with a plug for power supply 15, which is connectable to an automobile cigar lighter socket is connected via an on-off switch attached to the upper side plate of the housing 9. The plug for power supply 15 is contained in a recess (not shown) disposed in a lower side plate.

Figure 8:
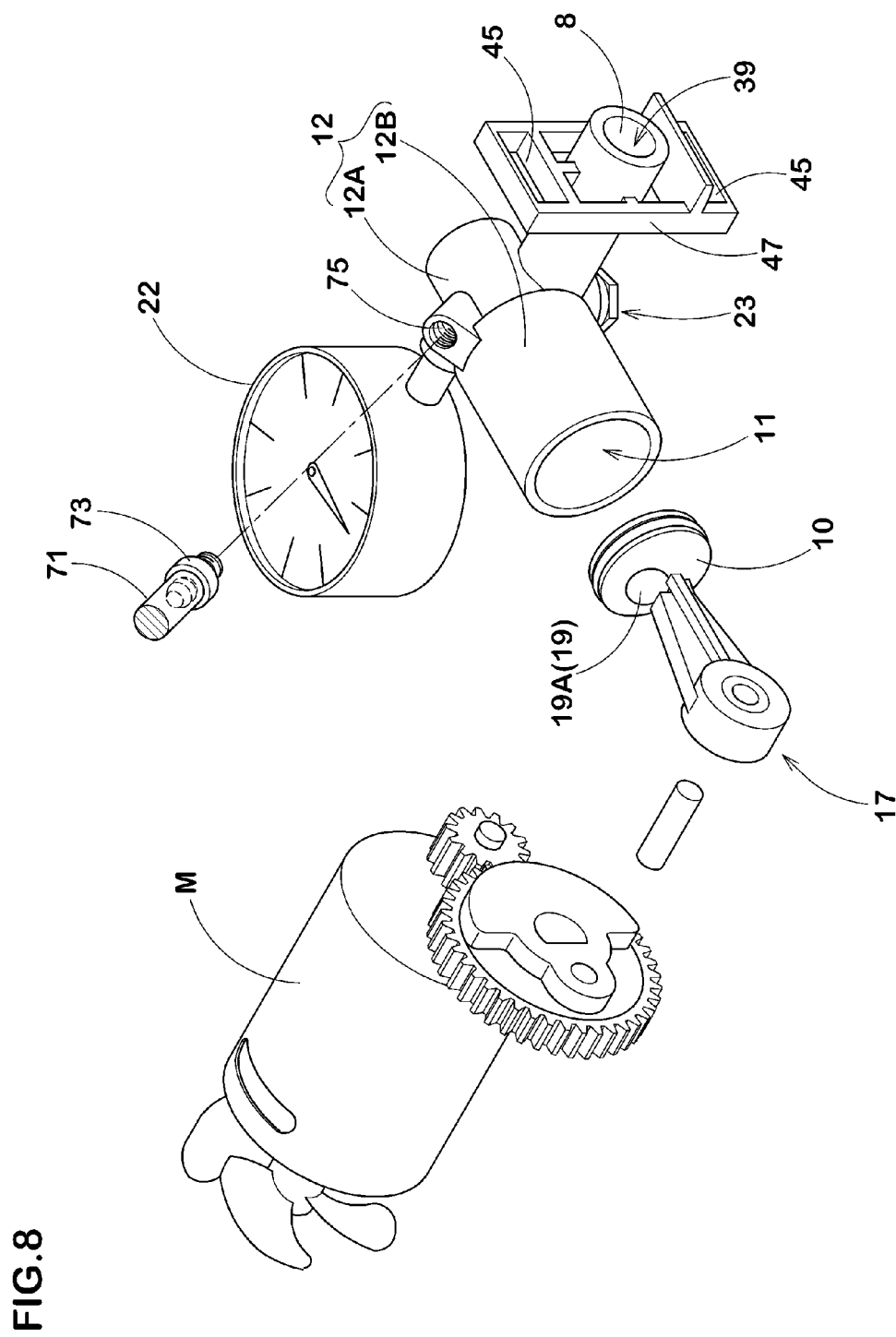
FIG. 8 is an exploded perspective view of a compressor body.
Figure 9:
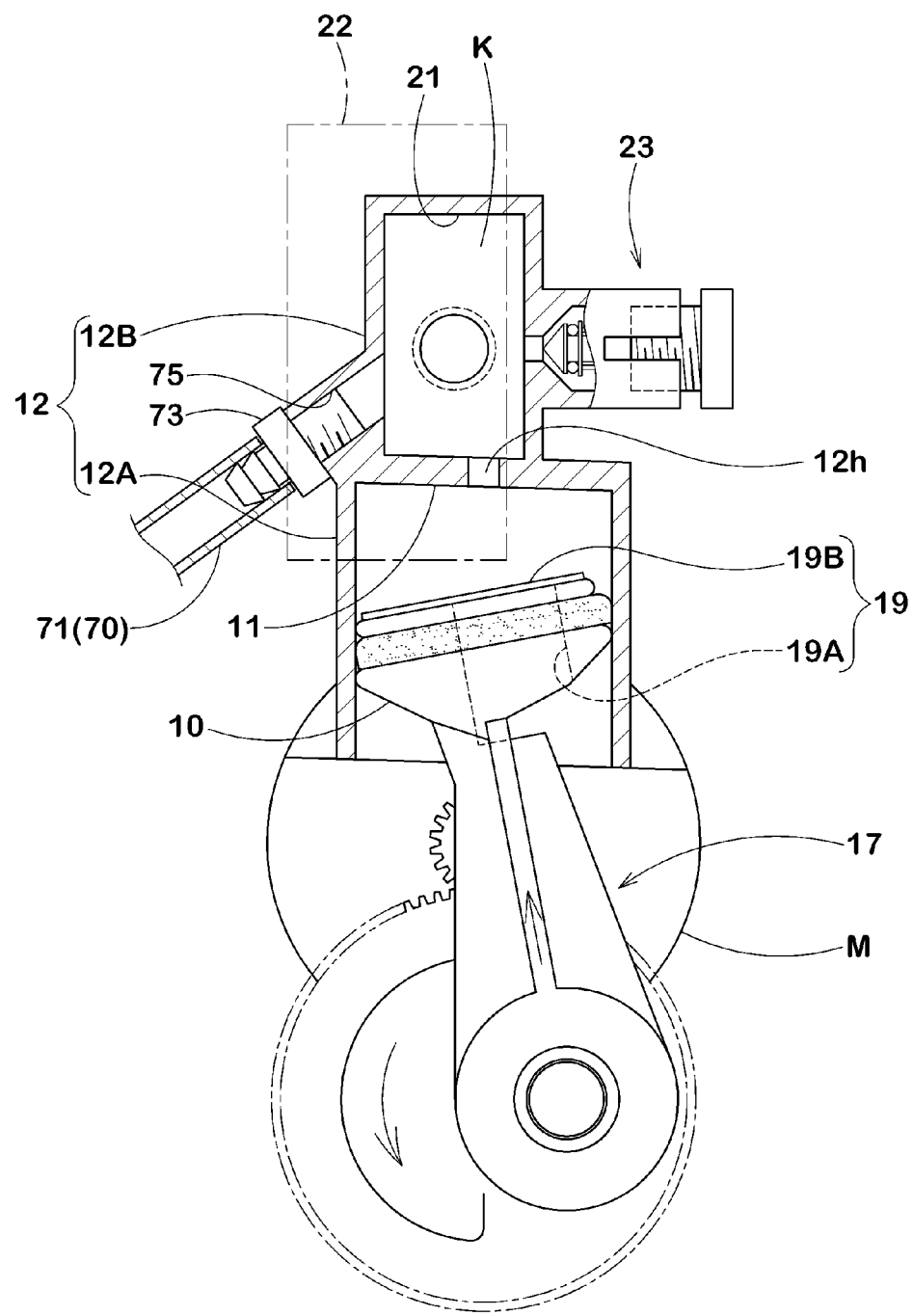
FIG. 9 is a partial cross sectional view of the major portion thereof.

The compressor main body 13 comprises, as shown in FIGS. 8 and 9, a piston 10 connected to the motor M via a crank mechanism 17, and a cylinder 12 enclosing reciprocatingly this piston 10 and forming a pump chamber 11 to compress the air between this cylinder and the piston 10. The piston 10 comprises an air intake valve 19 comprising an air intake hole 19A extending through this piston 10 in the direction of the shaft center, and a valve 19B closing this air intake hole 19A from the pump chamber side in spring property manner and formed of elastomer such as rubber, synthetic resin, metal and the like, for example.

In the present embodiment, the cylinder 12 is integrally provided on an end side of the cylinder main body 12A comprising the pump chamber 11 with a cylinder subpart 12B to comprise a branch chamber 21. The pump chamber 11 connects with a branch chamber 21 via a small hole 12*h*. The small hole 12*h* may be provided with the one-way valve (not shown). A volume V1 of the branch chamber 21 is smaller than a stroke volume V0 of the piston 10 in the pump chamber 11. In the present embodiment, the volume V1 is set to not more than 40% of the stroke volume V0, and making the cylinder 12 compact. Incidentally, the stroke volume V0 means a volume difference of the pump chamber 11 from the most backward condition (bottom dead center) to the most forward condition (top dead center) of the piston 10.

Thus, the branch chamber 21 is connected with an air feeding passage 39 to send the compressed air from this branch chamber 21 to the compressed air discharge port 8, a well-known manometer 22 to measure the pressure of the compressed air, and a well-known relief valve 23.

As shown in FIG. 3, the air feeding passage 39 is formed as a central hole of a connecting cylindrical portion 25 protruding from the cylinder subpart 12B through a first side plate 9S of the housing 9. This connecting cylindrical portion 25 is provided on its one end near the opening with a joint concave portion 28. This joint concave portion 28 is continuously provided on the front and back of the parallel hole part 28A having a constant inside diameter with forward and backward tapered surfaces 28B and 28C forming a tapered cone-shape toward the cylinder subpart 12B. The backward tapered surface 28C has substantially the same inclination as an apex of the tapered surface 41B of the connecting nozzle 41, and the backward tapered surface 28C abuts on the tapered surface 41B at the time of direct connection, thereby enabling the connecting nozzle 41 and the joint concave portion 28 to arrange accurately in a concentric position. The forward tapered surface 28B acts as a guide to insert the connecting nozzle 41.

In the puncture repair kit 1 comprising the compressor device 2 and the bottle unit 3 which are directly connected, a volume of a passage (K) from an outlet (small hole 12*h*) of the pump chamber 11 to the one-way valve 14 is small. Therefore, in the passage (K), a pressure fluctuation of the compressed air arisen by a reciprocatory motion of the piston 10 is not relieved, and the pressure of the compressed air inside the passage (K) largely changes. Moreover, the cap 6 is provided with the one-way valve 14, so that only the higher pressure fluctuation impressed air flows toward the tire through the one-way valve 14, and the manometer 22 measures only the lower compressed air of the pressure fluctuation. Consequently, there arises a large difference in pressure (variance D) between the actual internal pressure Pt of the pumped up tire and the pressure Pi displayed on the manometer 22.

Figure 10:
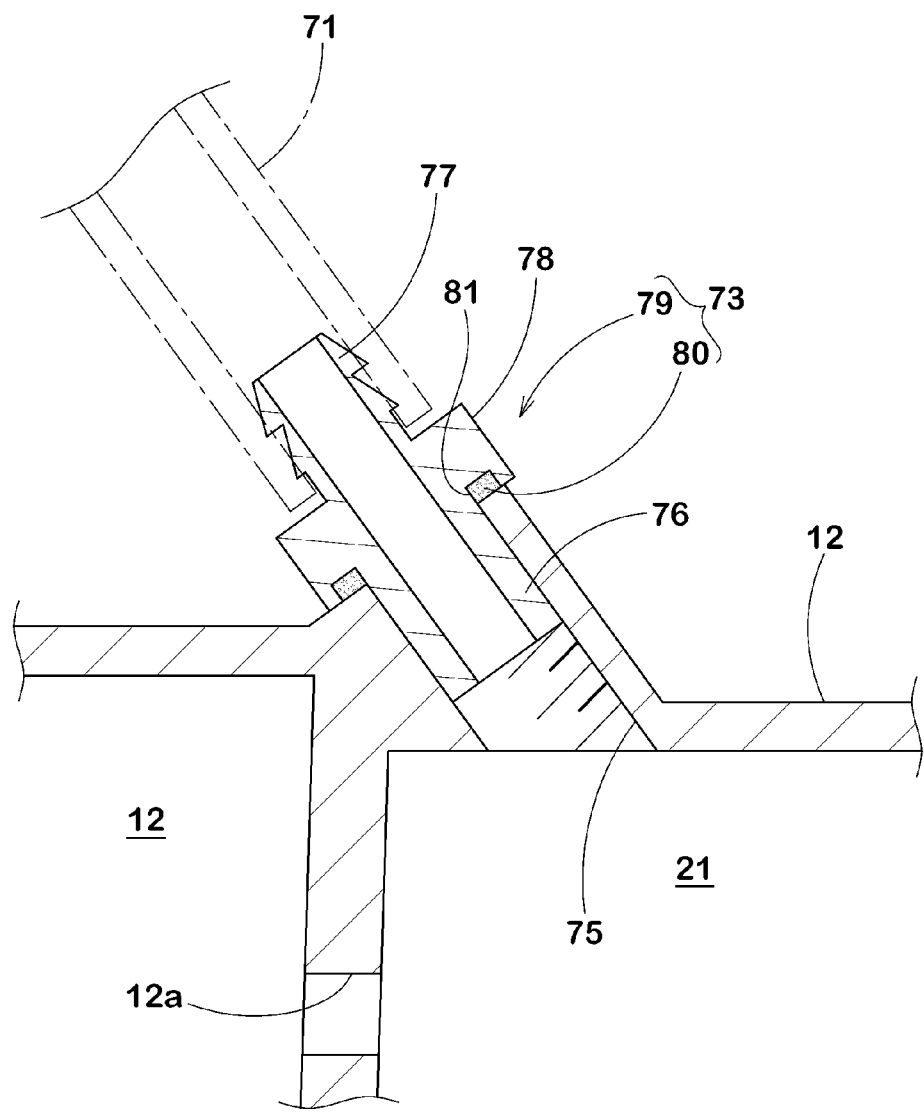
FIG. 10 is an enlarged partial cross sectional view showing a connected state of a cylinder and a surge chamber.
Figure 11:
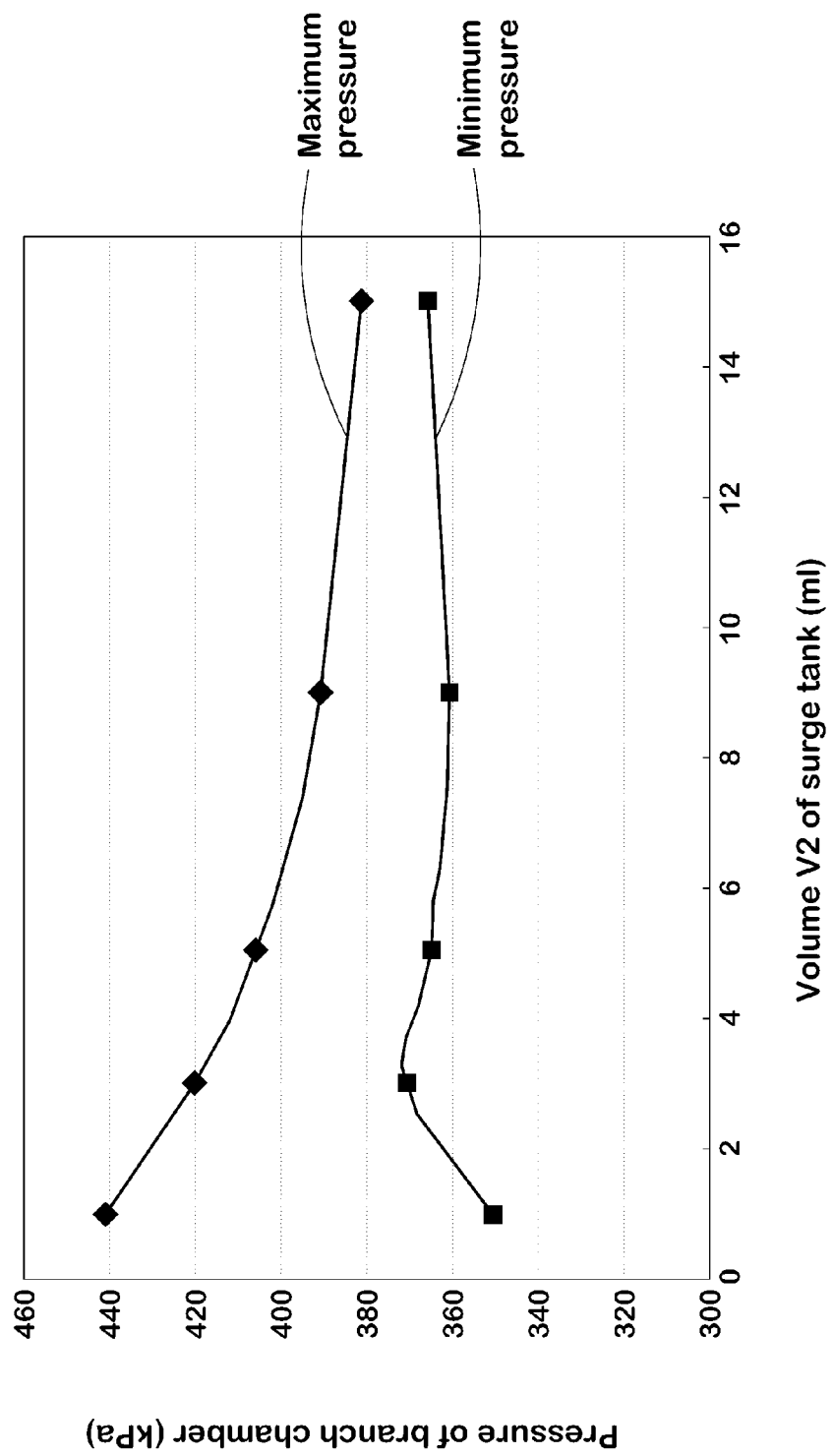
FIG. 11 is a graph showing the variation of the maximum pressure and the minimum pressure of the compressed air of the branch chamber with a pressure fluctuation of the volume of the surge chamber.

Thereupon, in the present embodiment, as shown in FIGS. 7-10, the branch chamber 21 is connected with a surge chamber 70 to store the compressed air from the pump chamber 11 and to reduce the pressure fluctuation of the compressed air. FIG. 11 is a graph to show changes of the maximum pressure and minimum pressure in the pressure fluctuation of the compressed air in the branch chamber 21 at the time that the volume V2 of the surge chamber 70 changes. It is confirmed from FIG. 11 that a pressure fluctuation range, which is a difference between the maximum pressure and the minimum pressure, can be reduced by increasing the volume V2.

In the present example, the surge chamber 70 comprises a hose 71 of which one end is connected with the branch chamber 21, and a buffer tank 72 connected with the other end thereof. The hose 71 is connected with the branch chamber 21 via a nipple fitting 73.

More particularly, there is formed a screw hole 75 linking to the branch chamber 21 on a side surface of the cylinder 12. As shown in FIG. 10 in closeup, the nipple fitting 73, a fitting main part 79 comprising an outside screw part 76 screwed in the screw hole 75, a bamboo-sprout-like hose joining section 77 connecting the hose 71, for example, and a large-diameter flange portion 78 disposed therebetween; and an annular rubber packing 80 such as an O-shaped ring, for example, disposed in a circumferential groove 81 concaved on the side surface of the outside screw part 76 of the flange portion 78.

By use of such a nipple fitting 73, the hose 71 can be fixed in the cylinder 12 easily in structure and compactly.

The buffer tank 72 is a pressure resisting tank and is connected with the hose 71 via the nipple fitting 73 in the present embodiment.

The volume V2 of the surge chamber 70 is preferably not less than 1.0 times the stroke volume V0 of the piston 10. When the volume V2 is under 1.0 times the stroke volume V0, the pressure fluctuation of the compressed air in the passage (K) is not sufficiently relaxed, and the variance D between the pressure Pi displayed on the manometer 22 and the actual tire internal pressure Pt is not sufficiently reduced. From this standpoint, the volume V2 is preferably not less than 2.0 times, more preferably not less than 3.0 times the stroke volume V0. The upper limit of the incidentally volume V2 is limited in response to a space inside the housing 9. A sum (V1+V2) of the volume V2 of the surge chamber 70 and the volume V1 of the branch chamber 21 is set to also preferably not less than 4.0 times the stroke volume V0.

The surge chamber 70 can be formed as the hose 71 of which one end is connected with the branch chamber 21 and of which the other end is closed. That is, without the buffer tank 72, the surge chamber 70 can be formed of the hose 71 only attached via the nipple fitting 73, for example. In this case, the volume V2 is adjusted according to a diameter and a length of the hose 71. Incidentally, the benefits of forming of only the hose 71 are that it is inexpensive and that the surge chamber 70 can be disposed freely depending on an empty space in the housing 9.

Figure 12:
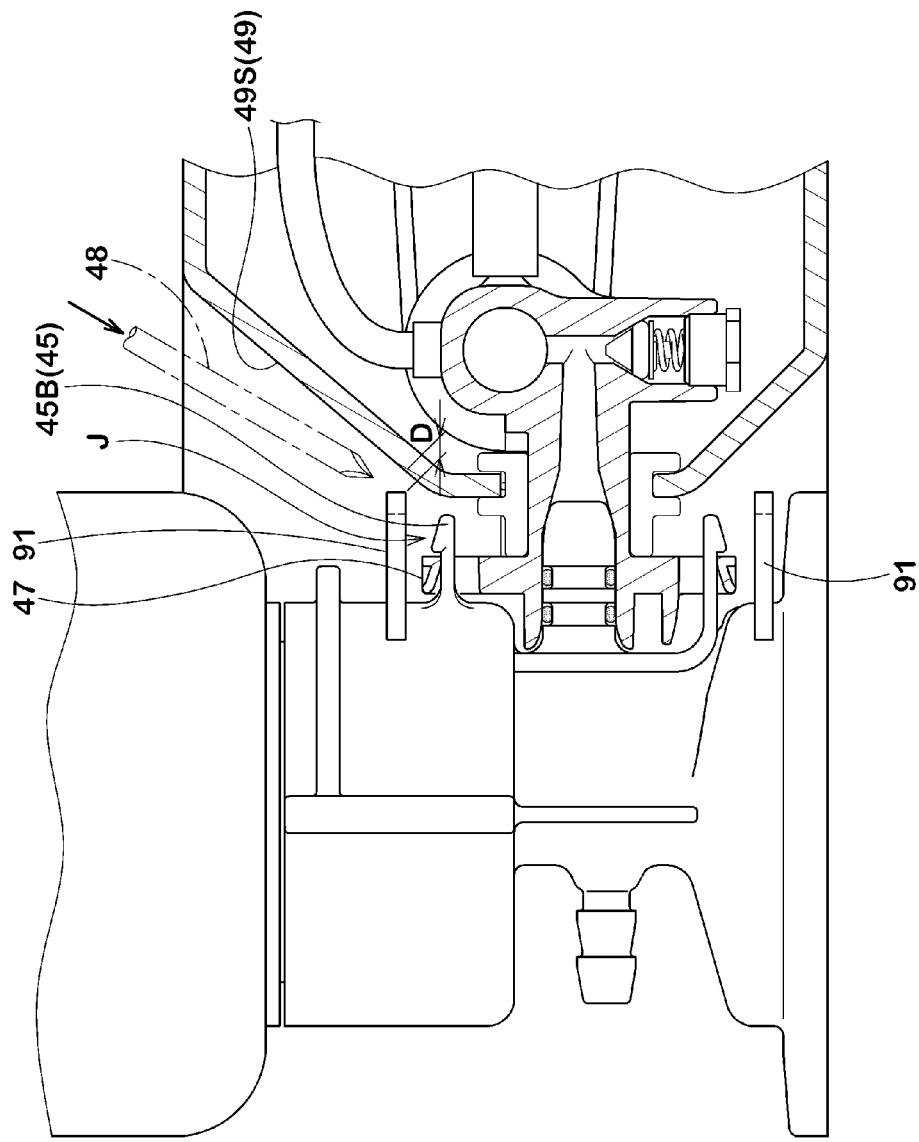
FIG. 12 is an cross-sectional view showing a connected state of the bottle unit with the compressor device.

On the side surface 9S of the compressor device 2 of the present embodiment, there is formed a substantially semi-circle dent 90 (shown in FIGS. 6 and 7) for fitting to the outer surface shape of the cap 6 and stabilizing the cap 6 on a seat. In the present embodiment, as shown in FIGS. 6 and 12, the compressor device 2 is provided with a guide groove 49 for leading a rod-like jig 48 such as a screw driver, for example, into an interlocking part J between the locking click 45 and the click interlocking hole 46 so as to release the interlocking. This guide groove 49 is an inclined groove having a groove basement 49S inclined toward the interlocking part J as a guide surface. The guide groove 49 can lead the rod-like jig 48 into the interlocking part J between the groove basement 49S and the groove-sidewall faces on its both sides. The locking click 45 comprises outwardly the hooking part 45B, and the interlocking can be easily released with pushing inwardly the hooking part 45B by the rod-like jig 48.

The compressor device 2 produces heat when compressing the air in the cylinder 12. Therefore, at the compressor operating time, the connecting nozzle 41 and the connecting cylindrical portion 25 connected directly with each other may rise to a high temperature. In particular, when the cylinder 12, the connecting cylindrical portion 25, and the frame 47 are formed as an integrally-formed metal body as the present embodiment, the temperatures of the connecting cylindrical portion 25 and the frame 47 rise high, and there may be danger.

Figure 13:
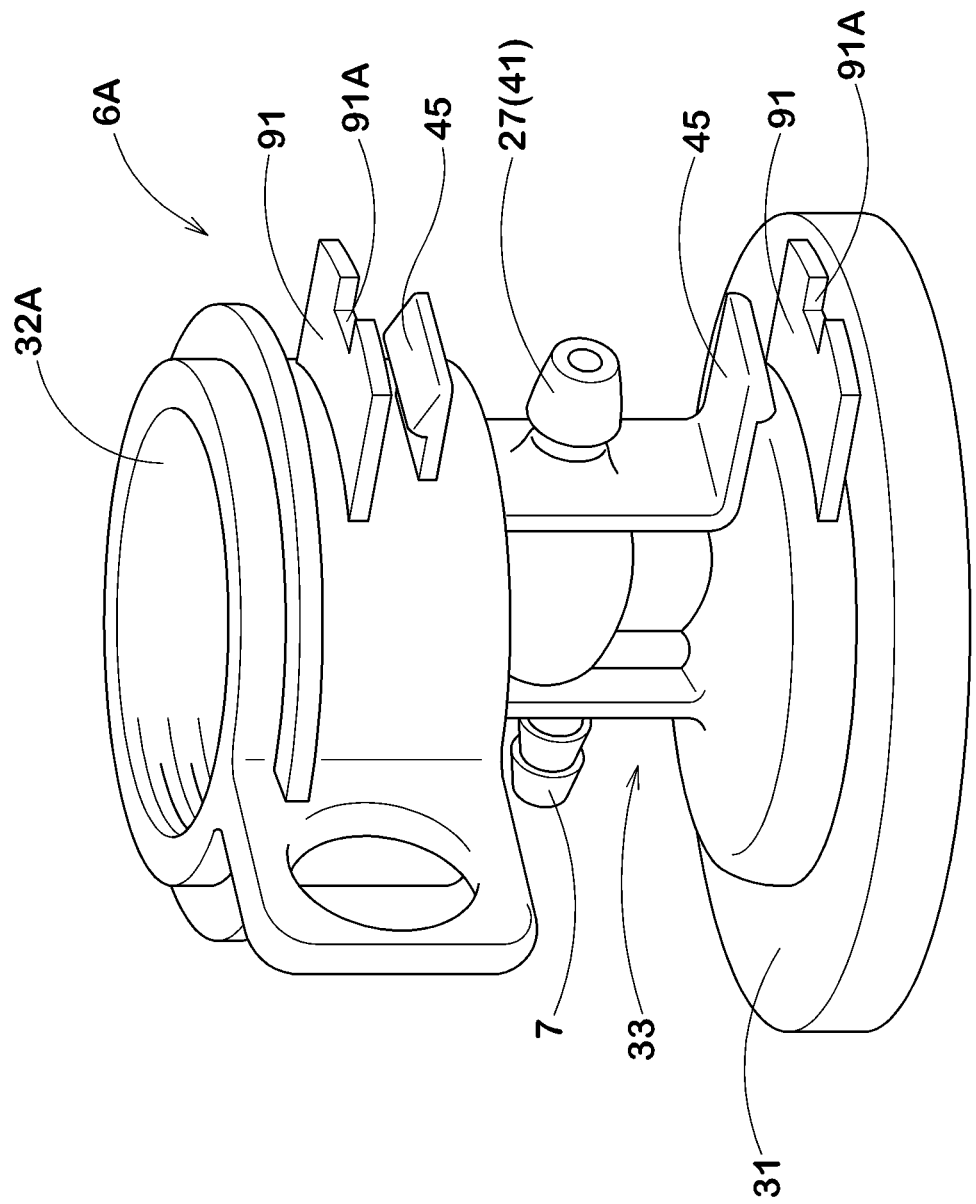
FIG. 13 is a perspective view of an external shape of the cap.

Therefore, in the present invention, as shown in FIGS. 12 and 13, the compressor device 2 is provided in the one side of the cap 6 with a contact protective wall 91 to prevent the user's hands and fingers from contacting the connecting nozzle 41 and the connecting cylindrical portion 25 at the direct connecting condition.

In the present example, the contact protective wall 91 is protruded in the cap 6. More particularly, the contact protective wall 91 is a pair of upper and lower plates protruding from the cap main part 6A. In the present example, to prevent from contacting to the frame, an upper contact protective wall 91 extends over an upper end of the frame 47 toward the housing 9, and the apex thereof is closely situated to the housing 9. A lower contact protective wall 91 also extends below the lower end of the frame 47 toward the housing 9, and the apex is closely situated to the housing 9.

In the present embodiment, the contact protective wall 91 proceeds into the race 49, and the apex thereof is closely situated to the groove bottom 49S of the race 49. Incidentally, a space D between the apex of the contact protective wall 71 and the groove bottom 49S is preferably set to not more than 8.0 mm not to put the user's hands and fingers in. The contact protective wall 91 of the present embodiment is provided at the apex with a notched part 91A to pass the rod-like jig 48 through. From viewpoint of the storage space of the bottle unit 3, the contact protective wall 91 is preferably not to get over from the peripheral edge of the basal plate 31.

Figure 14:
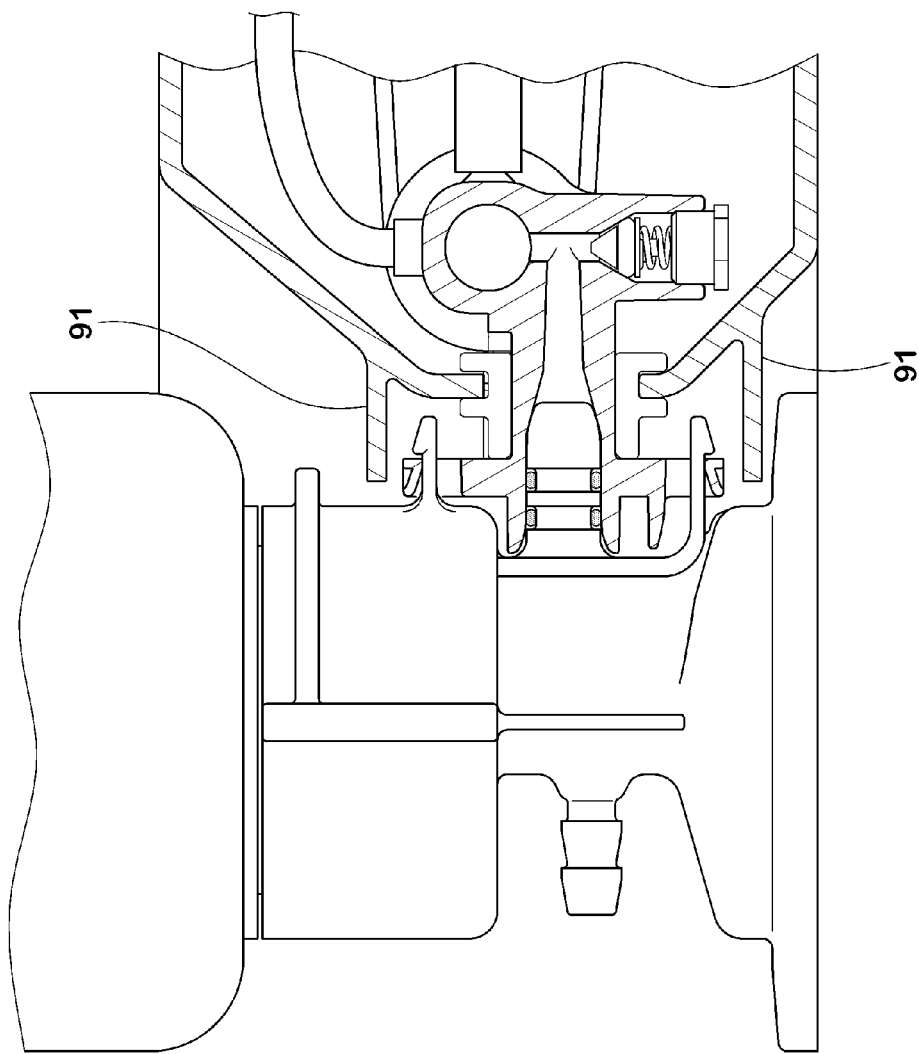
FIG. 14 is a cross-sectional view showing another embodiment of a contact protective wall.
Figure 15A:
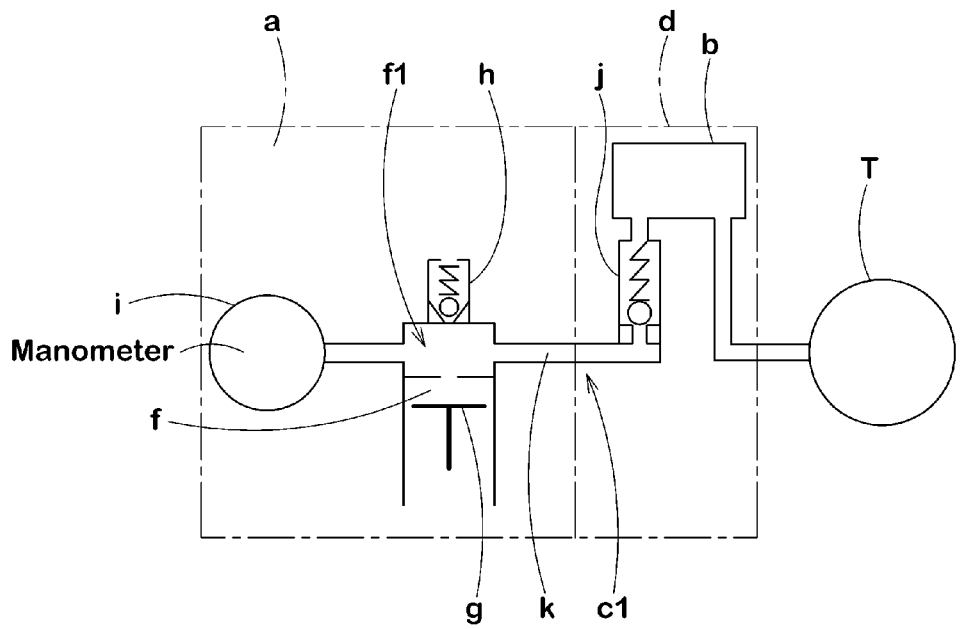
FIG. 15 (A) is a conceptual diagram showing a portion of an inside structure of the repair kit connecting directly the bottle unit with the compressor device.
Figure 15B:
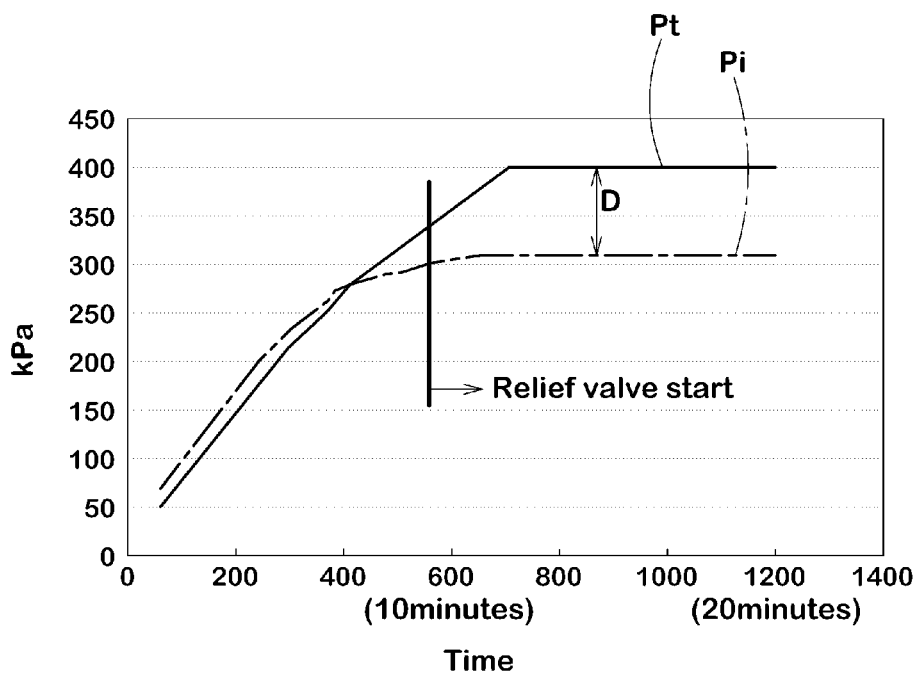
Figure 16:
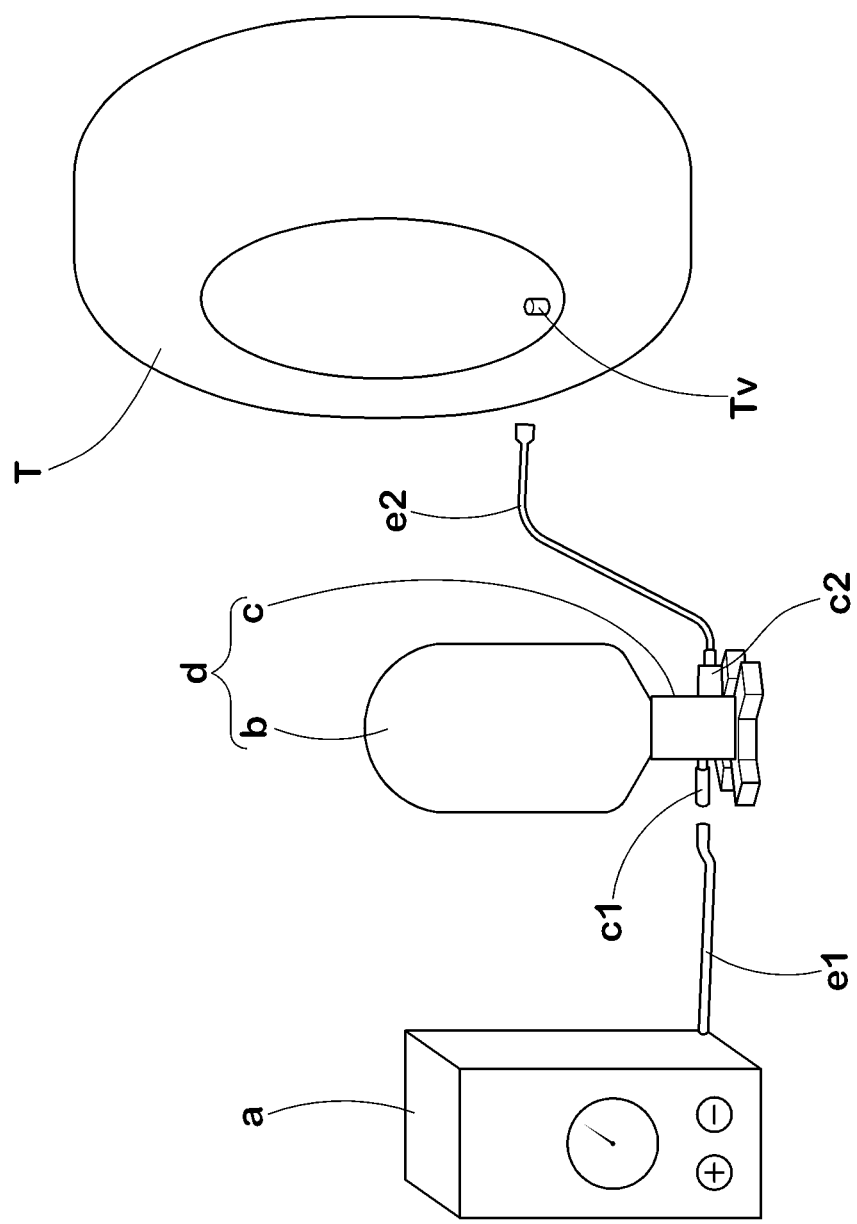
FIG. 16 is a perspective view explaining a conventional puncture repair kit.

The contact protective wall 91 can be protruded from the housing 9 of the compressor device 2 as shown in FIG. 14.

Although the especially preferred embodiments of the pneumatic tire and the method for manufacturing it in the present invention have been described in detail, needless to say, the invention is not limited to the above-mentioned concrete embodiments, and various modifications can be made.

Example

To confirm the efficacy of the present invention, a puncture repair kit comprising a bottle unit having a structure shown in FIG. 2 and a compressor device shown in FIG. 7 was manufactured for trial based on a specification shown in Table 1. The compressor device remained on, and a puncture repaired tire was pumped up to a relief pressure of a relief valve. Thus, an actual tire internal pressure Pt and a pressure Pi displayed on a manometer of that time with the passage of time were measured, and a pressure difference Pi−Pt was compared. In comparative Example and Examples, specifications other than a volume of a surge chamber are substantially the same.

Stroke volume V0 of piston in pump chamber: 4.0 cc
Volume V1 of branch chamber: 13 cc

TABLE 1

| | Com. Ex. 1 | Ex. 1 | Ex. 2 | Ex. 3 | Ex. 4 | Ex. 5 |
|---|---|---|---|---|---|---|
| Volume V2 of surge chamber [cc] | 0 | 3 | 4 | 8 | 12 | 15 |
| (Ratio V2/V0) | 0 | 0.75 | 1.0 | 2.0 | 3.0 | 3.7 |
| Pressure difference Pi − Pt [kPa] | 90 | 55 | 45 | 30 | 20 | 15 |

From Examples of Table, it was confirmed that the difference between the pressure displayed on the manometer of the compressor device and the actual tire internal pressure could be reduced owing to connecting the branch chamber with the surge chamber.

The invention claimed is:
1. A puncture repair kit comprising
a compressor device comprising a compressed air discharge port to discharge compressed air, and
a bottle unit comprising
a bottle container containing a puncture-sealing agent and
a cap provided on an opening of the bottle container, wherein
said cap comprises
an air intake port capable of connecting directly to said compressed air discharge port and of sending the compressed air from the compressed air discharge port into the bottle container through a first flow channel,
a sealing agent/compressed air outlet port to bring out in succession the puncture-sealing agent and the compressed air from said bottle container through the second flow channel by this sending of this compressed air, and
said first flow channel provided with a one-way valve to prevent from the puncture-sealing agent from flowing back toward the compressor device; and said compressor device comprises a cylinder comprising a pump chamber to compress the air with a reciprocatory motion of a piston, and a branch chamber receiving the compressed air from the pump chamber;
said branch chamber is connected to
  the air feeding passage sending the compressed air from the branch chamber to said compressed air discharge port,
  a manometer to measure a pressure of the compressed air, and
  a relief valve; and
said branch chamber is connected to a surge chamber to reduce a pressure fluctuation of the compressed air by storing the compressed air from said pump chamber.

2. The puncture repair kit as set forth in claim 1, wherein a volume of said surge chamber is not less than 1.0 times a stroke volume of the piston in said pump chamber.

3. The puncture repair kit as set forth in claim 1, wherein said surge chamber comprises
  a hose of which one end connected to said branch chamber, and
  a buffer tank connected to the other end of the hose.

4. The puncture repair kit as set forth in claim 1, wherein said surge chamber consists of a hose of which one end is connected to said branch chamber and of which the other end is closed.

5. The puncture repair kit as set forth in claim 3, wherein said hose is connected to a branch chamber via nipple fitting; and
said nipple fitting comprises
  a fitting main part comprising
    an outside screw part arranged in said cylinder and screwed to a screw hole leading to said branch chamber,
    a hose joining section connecting said hose, and
    a flange portion having a large diameter and disposed therebetween, and
  a rubber packing provided in a circumferential groove concaving on a side surface of an outside screw part of said flange portion.

6. The puncture repair kit as set forth in claim 1, wherein one of said compressed air discharge port and said air intake port is formed as a connecting nozzle protruding toward the other; and
the other is formed as a connecting cylindrical portion protruding toward the one and having a central hole, and said bottle unit and the compressor device are capable of connecting directly by connecting with said connecting nozzle into the central hole of said connecting cylindrical portion; and
said compressor device or said cap is provided with a convexed contact protective wall to prevent a user's hands and/or fingers from touching with said connecting nozzle and/or connecting cylindrical portion at said direct connection state.

7. The puncture repair kit as set forth in claim 6, wherein said connecting cylindrical portion is formed integrally with said cylinder.

8. The puncture repair kit as set forth in claim 6, wherein said contact protective wall is provided in said cap.

9. The puncture repair kit as set forth in claim 6, wherein said contact protective wall is provided in said compressor device.

10. The puncture repair kit as set forth in claim 2, wherein said surge chamber comprises
a hose of which one end connected to said branch chamber, and
a buffer tank connected to the other end of the hose.

11. The puncture repair kit as set forth in claim 2, wherein said surge chamber consists of a hose of which one end is connected to said branch chamber and of which the other end is closed.

12. The puncture repair kit as set forth in claim 4, wherein said hose is connected to a branch chamber via nipple fitting; and
said nipple fitting comprises
  a fitting main part comprising
    an outside screw part arranged in said cylinder and screwed to a screw hole leading to said branch chamber,
    a hose joining section connecting said hose, and
    a flange portion having a large diameter and disposed therebetween, and
  a rubber packing provided in a circumferential groove concaving on a side surface of an outside screw part of said flange portion.

13. The puncture repair kit as set forth in claim 2, wherein one of said compressed air discharge port and said air intake port is formed as a connecting nozzle protruding toward the other; and
the other is formed as a connecting cylindrical portion protruding toward the one and having a central hole, and said bottle unit and the compressor device are capable of connecting directly by connecting with said connecting nozzle into the central hole of said connecting cylindrical portion; and
said compressor device or said cap is provided with a convexed contact protective wall to prevent a user's hands and/or fingers from touching with said connecting nozzle and/or connecting cylindrical portion at said direct connection state.

14. The puncture repair kit as set forth in claim 3, wherein one of said compressed air discharge port and said air intake port is formed as a connecting nozzle protruding toward the other; and
the other is formed as a connecting cylindrical portion protruding toward the one and having a central hole, and said bottle unit and the compressor device are capable of connecting directly by connecting with said connecting nozzle into the central hole of said connecting cylindrical portion; and
said compressor device or said cap is provided with a convexed contact protective wall to prevent a user's hands and/or fingers from touching with said connecting nozzle and/or connecting cylindrical portion at said direct connection state.

15. The puncture repair kit as set forth in claim 4, wherein one of said compressed air discharge port and said air intake port is formed as a connecting nozzle protruding toward the other; and
the other is formed as a connecting cylindrical portion protruding toward the one and having a central hole, and said bottle unit and the compressor device are capable of connecting directly by connecting with said connecting nozzle into the central hole of said connecting cylindrical portion; and
said compressor device or said cap is provided with a convexed contact protective wall to prevent a user's hands and/or fingers from touching with said connecting nozzle and/or connecting cylindrical portion at said direct connection state.

16. The puncture repair kit as set forth in claim 5, wherein
one of said compressed air discharge port and said air intake port is formed as a connecting nozzle protruding toward the other; and
the other is formed as a connecting cylindrical portion protruding toward the one and having a central hole, and said bottle unit and the compressor device are capable of connecting directly by connecting with said connecting nozzle into the central hole of said connecting cylindrical portion; and
said compressor device or said cap is provided with a convexed contact protective wall to prevent a user's hands and/or fingers from touching with said connecting nozzle and/or connecting cylindrical portion at said direct connection state.

17. The puncture repair kit as set forth in claim 7, wherein said contact protective wall is provided in said cap.

18. The puncture repair kit as set forth in claim 7, wherein said contact protective wall is provided in said compressor device.

\* \* \* \* \*